United States Patent [19]
Zelikov

[11] Patent Number: 5,509,518
[45] Date of Patent: Apr. 23, 1996

[54] DIAPHRAGM CLUTCH ASSEMBLY WITH WEAR COMPENSATOR

[75] Inventor: Alexander Zelikov, Farmington, Mich.

[73] Assignee: Valeo Clutches and Transmissions, Inc., Hampton, Va.

[21] Appl. No.: 230,844

[22] Filed: Apr. 21, 1994

[51] Int. Cl.$^6$ .................................................. F16D 13/75
[52] U.S. Cl. ............................ 192/70.25; 192/70.18; 192/89.23; 192/109 A; 192/111 A
[58] Field of Search ......................... 192/70.25, 111 A, 192/70.18, 109 R, 109 A, 89.23

[56] References Cited

U.S. PATENT DOCUMENTS

| | | | |
|---|---|---|---|
| 5,090,536 | 2/1992 | Asada | 192/70.25 |
| 5,186,298 | 2/1993 | Takeuchi | 192/111 A |

FOREIGN PATENT DOCUMENTS

| | | | |
|---|---|---|---|
| 2599446 | 12/1987 | France | 192/111 A |
| 59-13126 | 1/1984 | Japan | 192/89.23 |
| 2022729 | 12/1979 | United Kingdom. | |

*Primary Examiner*—Richard M. Lorence
*Attorney, Agent, or Firm*—Longacre & White

[57] ABSTRACT

A diaphragm spring clutch assembly has a self adjusting mechanism operable in use to compensate for wear of the clutch friction lining. The mechanism comprises a pressure plate having a pressure plate body, a separate, generally annular, fulcrum member which is axially moveable with respect to the pressure plate body, and a control member adapted to control relative axial movement between the fulcrum member and the pressure plate body and being itself axially displaceable with respect to the pressure plate body and the fulcrum member on wear of the friction linings, thereby to permit a corresponding movement of the fulcrum member away from the friction surface. the fulcrum member is moved axially away from the friction surface during declutching, and a one way connection is provided between the fulcrum member and the pressure plate body operable to prevent return movement of the fulcrum member when the clutch is engaged. In this way, wear in the friction linings is automatically compensated by a corresponding movement of the pressure plate fulcrum. The orientation of the diaphragm spring remains constant, eliminating the need for adjustment during the service of the clutch. The invention is particularly applicable to clutches for automobiles.

12 Claims, 5 Drawing Sheets

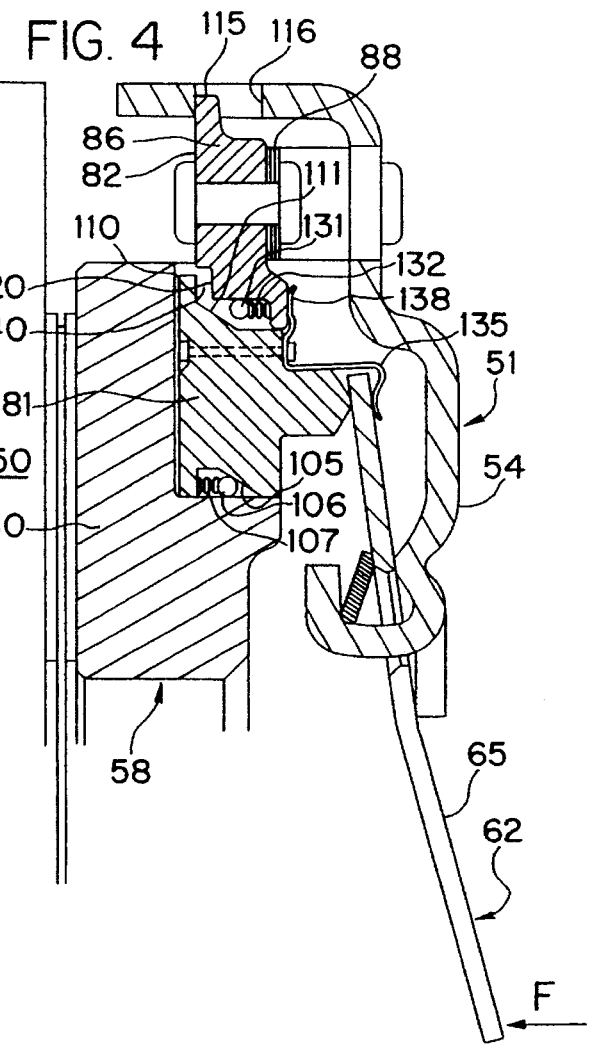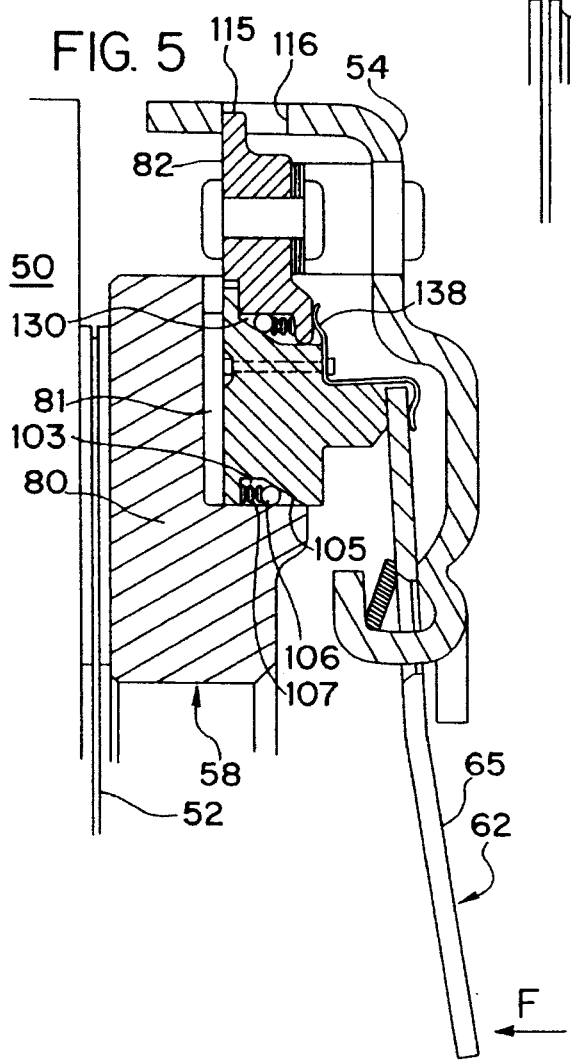

DIAPHRAGM CLUTCH ASSEMBLY WITH WEAR COMPENSATOR

FIELD OF THE INVENTION

This invention relates to clutch assemblies of the kind which are operated by a diaphragm spring, and which are commonly used in motor vehicles. More particularly, the invention is concerned with mechanisms for automatically compensating for wear in such clutch assemblies.

BACKGROUND OF THE INVENTION

Diaphragm spring clutch assemblies generally comprise a cover assembly which is mounted on the engine flywheel and which comprises a cover housing an axially moveable pressure plate connected in rotation with the cover by means of resilient straps, and a diaphragm spring which provides the load on the pressure plate;

a clutch disc which is splined on the input shaft of the gearbox, and which is clamped between the engine flywheel and the pressure plate;

and a release bearing assembly which acts on the inner periphery of the diaphragm to cause the spring to pivot about its mounting in the cover and thereby release the load on the pressure plate.

The diaphragm spring itself generally comprises an outer peripheral part in the form of a Belleville washer ring which acts on the pressure plate, and an inner skirt which is divided by radial fingers. The spring is mounted for rocking movement between a pair of fulcrums carried by the pressed metal cover, and the release bearing is adapted to act on the radially innermost ends of these fingers to cause the diaphragm spring to pivot between these fulcrums, thereby releasing the load and disengaging the clutch.

The outer peripheral part of the diaphragm spring usually acts on the pressure plate through an annular fulcrum formed on the pressure plate. In a push type clutch, in which the release bearing pushes the inner ends of the fingers of the diaphragm spring to disengage the clutch, the annular fulcrum on the pressure plate is radially outwards of the ring of fulcrums on the metal cover. In a pull-type clutch the fulcrums on the metal cover are radially outwards of the annular fulcrum on the pressure plate.

During the service life of the clutch, as the friction linings of the clutch disc wear, the engaged position of the pressure plate moves progressively closer towards the flywheel. Since the Belleville washer part of the diaphragm spring is always in contact with the annular fulcrum of the pressure plate, the ends of the fingers of the diaphragm spring move progressively in the opposite direction away from the pressure plate in a push-type clutch and towards it in a pull-type clutch. The load exerted by the diaphragm spring on the pressure plate begins to diminish, and if no action is taken, the clutch will eventually slip, leading to clutch failure.

Adjustment of the clutch to take into account the wear occurring during its service life requires that the release bearing should be moved progressively along the input shaft of the gearbox away from the ends of the fingers of the diaphragm spring as the clutch wears. However, this has the effect of increasing the pedal travel, and may also increase the pedal effort required during declutching.

Various solutions to this problem have been proposed in order to achieve automatic adjustment of the clutch during its service life, and to provide for constant pedal load. One such arrangement is described in British published patent application GB 2022729A (Borg-Warner). In this proposal, the pressure plate fulcrum surface against which the diaphragm spring bears consists of a separate ring member which is connected to the pressure plate and which is continuously adjustable axially relative to the pressure plate by a series of camming surfaces which move the fulcrum surface outwardly as the clutch friction linings wear. The travel and load characteristics of the diaphragm spring thus remain constant during the service life of the clutch and no adjustment of the release bearing is necessary. However, this arrangement is rather complex in its construction.

In the arrangement described in U.S. Pat. No. 5,090,536 (Asada) the pressure plate fulcrum again consists of a separate ring member which in this case is screwed into the main body of the pressure plate. Rotation of the ring member in its thread in the pressure plate causes the fulcrum to move away from the friction surface. The ring member is rotated by means of a worm wheel which is operated by a lever and ratchet mechanism responsive to movement of the declutching mechanism. Again, this arrangement is complex both in its construction and operation.

It is an object of the present invention to provide a clutch assembly which incorporates an automatic wear compensating device.

It is a further object of the invention to provide a clutch assembly in which the displacement of the diaphgram spring and its load characteristics remain substantially constant throughout the service life of the clutch.

It is a further object of the invention to provide a clutch assembly having an automatic wear compensating arrangement which is relatively simple in construction and operation.

SUMMARY OF THE INVENTION

In a diaphragm spring clutch assembly of the kind described, the invention provides a self adjusting mechanism operable in use to compensate for axial movement of the pressure plate fulcrum towards the flywheel as a result of wear of the friction linings, by providing a pressure plate which comprises a generally annular pressure plate body formed with the friction surface; a generally annular fulcrum member which is axially moveable with respect to the pressure plate body; a control member adapted to control the relative axial movement of the fulcrum member and being axially displaceable with respect to the pressure plate body and the fulcrum member on wear of the friction linings, thereby to permit a corresponding movement of the fulcrum member axially away from the friction surface; means for moving the fulcrum member axially away from the friction surface during declutching; and a one-way connection disposed between the fulcrum member and the pressure plate body operable to prevent return movement of the fulcrum member relative to the pressure plate body towards the friction surface.

The invention thus provides an arrangement in which the fulcrum member is separated from the main body of the pressure plate and is moveable away from the friction surface on sensing of clutch disc wear by a control member. The control member is displaceable by said wear in a direction away from the fulcrum member, creating a gap into which the fulcrum member can move during declutching. The one-way connection between the fulcrum member and the pressure plate body prevents return movement of the fulcrum member on re-engagement of the clutch.

Sensing of the wear occurring in the friction linings is achieved by abutment of the control member with the cover member when the clutch is engaged. This abutment causes the control member to separate from the fulcrum member and the pressure plate body during clutch engagement, thereby creating the gap into which the fulcrum member can move.

Axial movement of the fulcrum member away from the main body can be achieved by any suitable means such as a spring; in the preferred embodiment, connection means are provided connecting the fulcrum member to the diaphragm spring, and the fulcrum member is moved axially away from the friction surface during declutching by the diaphragm spring itself, which pulls the fulcrum member away from the pressure plate.

Preferably, both the pressure plate body and the control member are connected to the cover by generally tangential torque-transmitting resilient straps, each of which is connected at one end to the cover member and at the other end to the pressure plate, and between the two ends, to the control member. Since these straps tend to retract both the main body and the control member during declutching, a one-way connection is suitably provided between the control member and the fulcrum member operable to prevent retraction of the control member during declutching in order to maintain the gap into which the fulcrum member can move.

The invention also comprehends a clutch cover assembly having the aforesaid features.

In order that the invention may be more fully understood, an embodiment in accordance therewith will now be described with reference to the accompanying drawings.

BRIEF DESCRIPTION OF THE DRAWINGS

FIG. 4 is a sectional view of the same clutch shown in FIGS. 2 and 3 in the clutch engaged position after wear has occurred to the friction linings;

FIG. 5 is a similar view to FIG. 4, showing the position of the components during clutch disengagement after wear of the friction linings.

DETAILED DESCRIPTION OF A PREFERRED EMBODIMENT OF THE INVENTION

Figure 1:
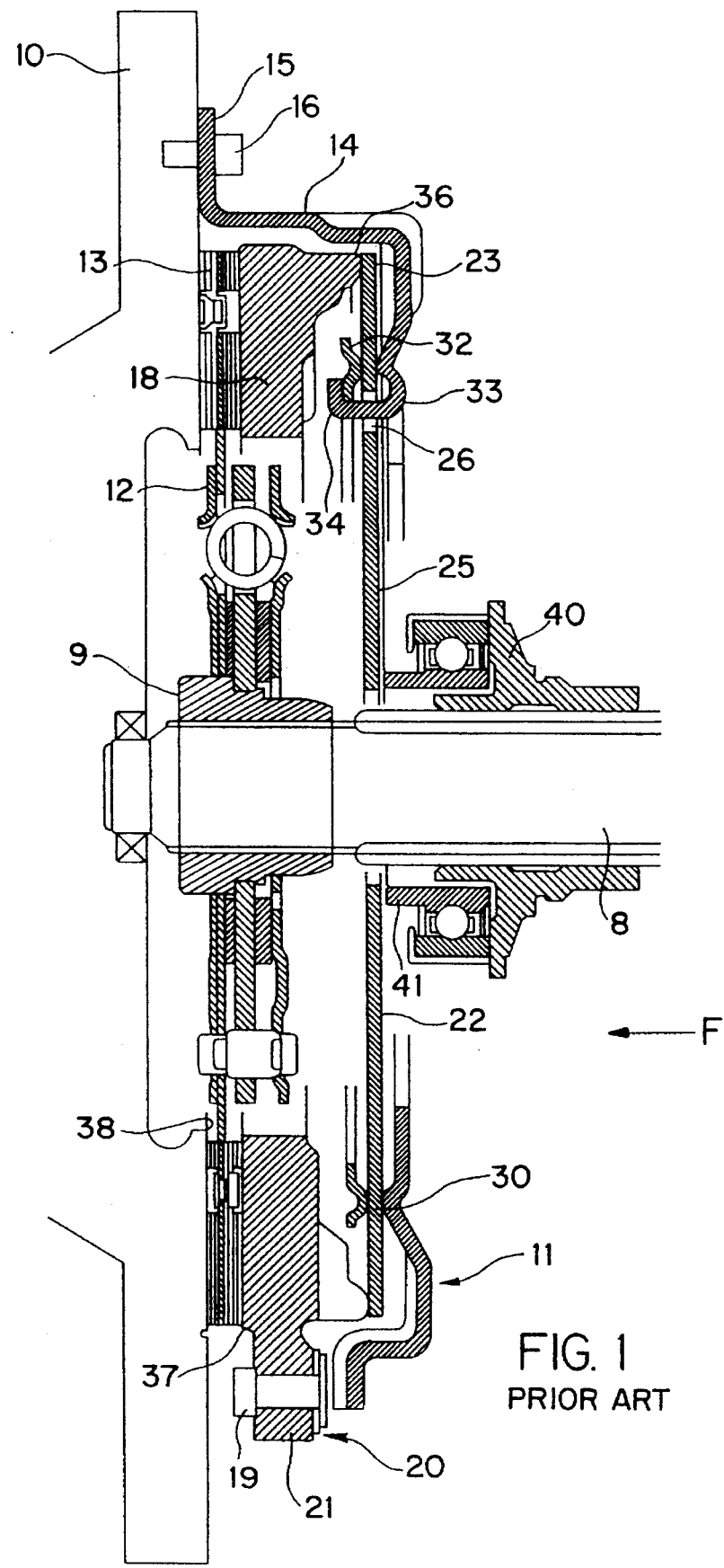
FIG. 1 is a cross-sectional view taken through a conventional diaphragm spring clutch of the kind suitable for use in a motor vehicle, and is illustrated to assist in the understanding of the invention.

Referring to the drawings, the apparatus will be described with the assistance of FIG. 1, which shows a conventional form of diaphragm spring clutch of the kind commonly used in motor vehicles. The clutch is mounted between gearbox input shaft 8 and engine flywheel 10 and essentially comprises a cover assembly generally indicated at 11, a clutch friction disc 12 having a splined central boss 9 engaging corresponding splines formed on the input shaft 8, and a release bearing assembly 40.

The cover assembly 11 comprises a pressed steel cover 14 having an annular flange 15 by which it is secured to the flywheel 10 by means of screws 16. The pressed steel cover 14 houses a pressure plate 18 which is rotatably connected to the cover by generally tangential torque transmitting resilient straps 20 each connected at one end by a rivet 19 to a corresponding lug 21 on pressure plate 18, and at the other end by a rivet (not shown) to the cover 14. Straps 20 tend to retract pressure plate 18 into cover 14 and provide for the release of the clutch disc 12 during declutching.

Cover 14 also supports a diaphragm spring 22 which is frustoconical in its free state and which has an outer elastic peripheral portion 23 of substantially annular form (a Belleville washer), and an inner skirt (or central part) divided into a series of resilient fingers 25 by slots formed in the diaphragm spring. Holes 26 are provided between adjacent fingers.

The diaphragm spring 22 is retained in the cover against a primary fulcrum 30 comprising an annular bead formed on the inside surface of the cover 14 by a pressing operation. A secondary fulcrum having the same diameter as the primary fulcrum supports the diaphragm spring on its other side and comprises an annular support ring 32 retained in position by means of lugs 33 which are bent out from the cover 14 and which pass through holes 26 in the diaphragm spring 22. The free ends 34 of lugs 33 are turned radially outwardly to retain support ring 32 in position.

In the engaged position of the clutch shown in FIG. 1, the diaphragm spring 22 is deformed from its free state into a flat position in which the Belleville washer portion 23 applies load to a pressure plate fulcrum comprising a circular (or castellated) boss 36 provided on the adjacent face of the pressure plate 18. This clamps the friction linings 13 of clutch disc 12 between friction surface 37 of pressure plate 18 and friction surface 38 of engine flywheel 10, thus establishing a solid connection between engine flywheel 10 and gearbox input shaft 8 via the central hub 9 of clutch disc 12.

Declutching takes place when clutch release bearing 40 is moved in the direction of arrow F to cause inner race 41 of the ball bearing to exert an axial thrust on resilient fingers 25 of diaphragm spring 22. This causes the outer elastic peripheral portion of the diaphragm spring to pivot between its primary and secondary fulcrums 30, 32, thus releasing the load on pressure plate 18. As this load is released, straps 20 retract the pressure plate 18 and free the clutch disc, thereby breaking the connection between the engine flywheel 10 and the input shaft 8 of the gearbox.

Axial movement of clutch release bearing 40 along input shaft 8 is usually controlled by means of a clutch release fork which can be operated e.g. hydraulically or mechanically.

As will be apparent from FIG. 1, as the friction linings 13 of clutch disc 12 wear during the operational life of the clutch, the diaphragm spring 22 will tend to adopt a more inclined position in the clutch assembly with the peripheral portion 23 moving closer to the engine flywheel 10, and the fingers 25 moving in the opposite direction towards the clutch release bearing 40. If this movement of the clutch release fingers 25 is sufficient to take up the clearance between these fingers and the release bearing 40, fingers 25 will engage the inner race 41 of the release bearing even in the clutch engaged position, and the full load of the diaphragm spring will not be applied to the pressure plate; furthermore, the release bearing travel increases, constituting travel wear. Unless the position of the release bearing is adjusted to re-establish this clearance, the clutch will eventually slip. A substantial proportion of clutch failures are due to failure to maintain this adjustment during the operational life of the clutch.

Figure 2:
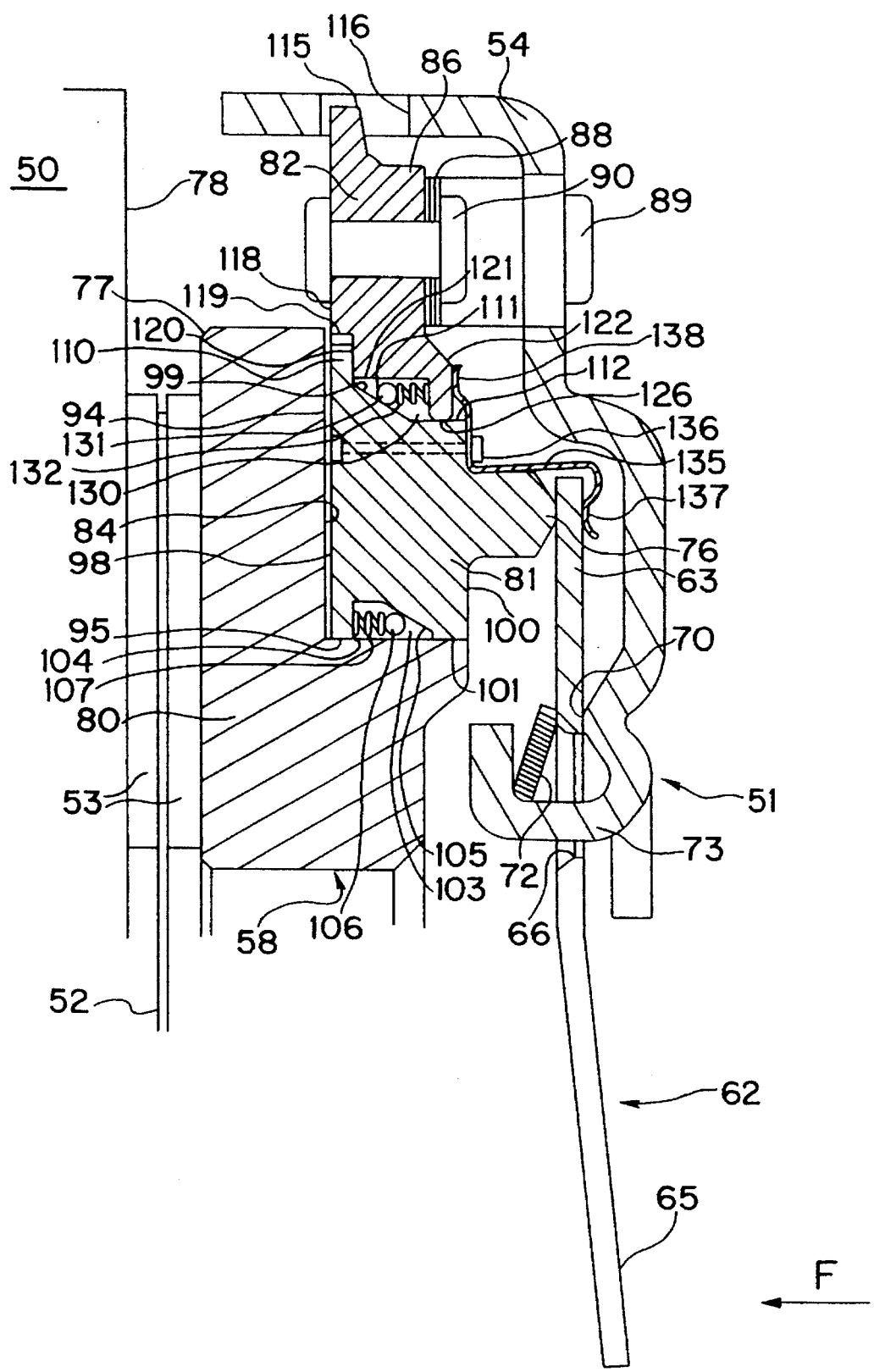
FIG. 2 is a sectional view of part of a diaphragm spring clutch fitted with an automatic wear compensating mechanism according to the invention.
Figure 3:
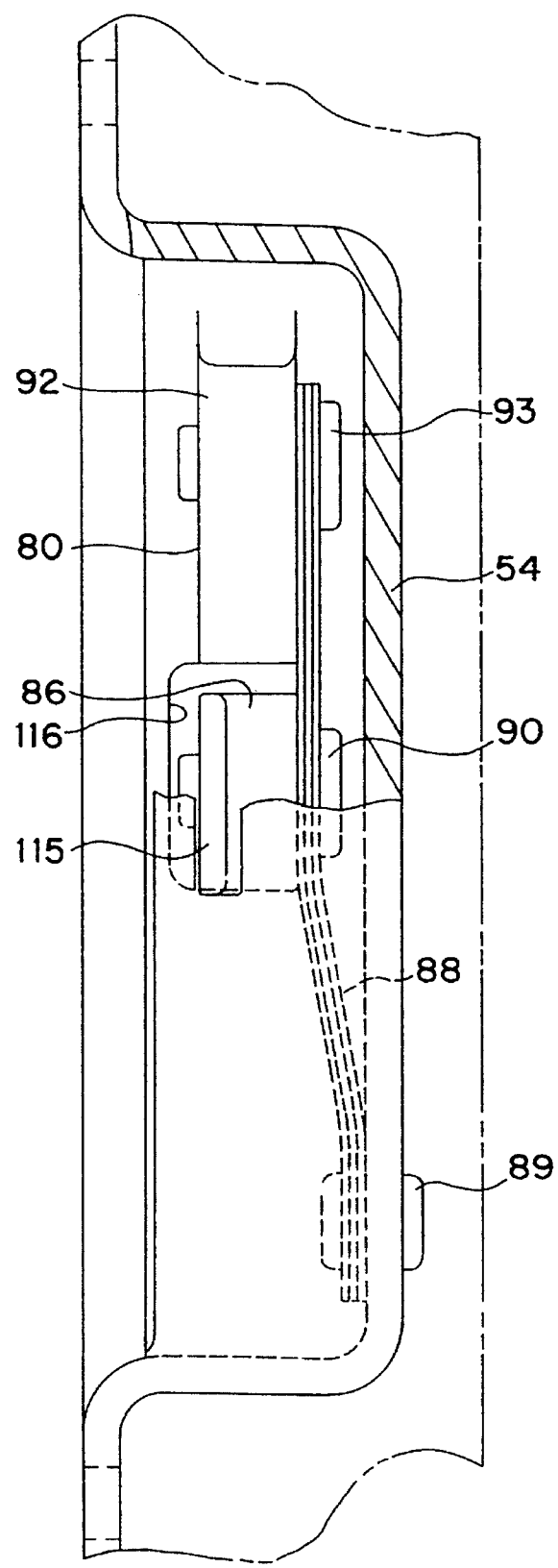
FIG. 3 is a part-sectional view of the pressed steel cover of the clutch shown in FIG. 2 illustrating a torque-transmitting drive strap.

FIGS. 2 and 3 show different views of a clutch cover assembly incorporating an automatic wear compensation mechanism according to the invention. FIGS. 4 and 5 are views of the same components shown in FIG. 2, illustrating the various operational positions of the mechanism following wear of the clutch disc during the service life of the clutch.

The clutch assembly of FIGS. 2 and 3 is of similar construction to the conventional assembly shown in FIG. 1, comprising an engine flywheel 50, a cover assembly 51, a pressure plate 58, and a clutch disc 52 incorporating friction linings 53 clamped between friction surfaces 77, 78 of pressure plate 58 and engine flywheel 50 respectively. In the clutch engaged condition illustrated in FIG. 2, no wear has taken place in the clutch, i.e. linings 53 are new and unworn.

As previously described, cover assembly 51 comprises a pressed steel cover 54 secured to the flywheel 50 by screws (not shown), housing a diaphragm spring 62 between a primary fulcrum 70 comprising an annular bead formed on cover 54, and a secondary fulcrum 72 comprising an annular support ring located by lugs 73 bent out from the cover and passing through holes 66 formed in the diaphragm. The free end of lugs 33 are turned radially outwardly to retain the supporting ring in position. The outer peripheral portion 63 of the diaphragm 62 bears on circular pressure plate fulcrum 76 to provide the clamping load. Declutching is achieved by pushing the fingers 65 of the diaphragm inwardly in the direction of arrow F to release the clamping load, as described with reference to FIG. 1.

The cover assembly shown in FIGS. 2 to 5 is designed automatically to compensate for wear of the friction linings 3 by moving the pressure plate fulcrum 76 in a direction away from the engine flywheel 50 by the same amount that the clutch disc 52 wears, continuously and automatically throughout the service life of the clutch.

To this end, the pressure plate 58 is formed of three separate parts; namely a main body 80 which incorporates the friction surface 77; a fulcrum member comprising an annular fulcrum ring 81 which incorporates the pressure plate fulcrum 76; and a control member comprising an annular outer ring 82. Fulcrum ring 81 is received within a circular recess 84 formed in the outer periphery of main body 80 on the side opposite friction surface 77, and, as will be described hereinafter, is axially displaceable within this recess away from the main body 80. Outer ring 82 is supported by fulcrum ring 81 and, also as will be described hereinafter, is axially displaceable relative to both main body 80 and fulcrum ring 81.

Outer ring 82 is formed with a plurality of ears 86 projecting from and spaced around its outer periphery. Each of these ears serve for attaching outer ring 82 to cover 54 by a generally tangential drive strap 88, which is fixed to the cover at one end by a rivet 89 and, intermediate its ends, to the respective ear 86 by a rivet 90 (see FIG. 3). Transmission of torque to the pressure plate is achieved by fixing the other end of the drive strap 88 to a corresponding lug 92 provided on main body 80 by rivet 93. Straps 88 thus serve to connect the main body 80, outer ring 82 and cover 54 in rotation whilst allowing the pressure plate 58 to move axially relative to the pressed cover 54 for clutching and declutching in the conventional manner, and at the same time allowing a small degree of relative axial displacement between outer ring 82 and main body 80. The radially outermost ends of ears 86 incorporate lugs 115 which extend into openings 116 formed at intervals in the outer wall of the pressed cover 54. The purpose of these lugs 115 in the wear compensating mechanism will be described, but they have a secondary function in retaining the pressure plate assembly in position within the cover against the action of the diaphragm spring before the cover assembly 51 is assembled onto the flywheel 50, thereby limiting deflection of the drive straps 88, which are inclined between the rivets 88, 90.

The circular recess 84 formed in the rear face of the main body 80 accommodating fulcrum ring 81 comprises a front face 94 defining a radially extending plane surface, and a cylindrical portion 95. Fulcrum ring 81 comprises a plane front wall 98, an outer peripheral wall 99, a rear wall 100 incorporating the pressure plate fulcrum 76, and an inner peripheral wall 101 adapted to engage and slide over cylindrical portion 95.

Inner peripheral wall 101 of the fulcrum ring 81 is formed with a circular groove 103 comprising a front wall 104 and an inclined rear wall 105 which forms a circular ramp around the inner periphery of the fulcrum ring. A split spring ring 106 having a gap therein is disposed in the circular groove 103 and is urged axially away from the flywheel 50 by spring means 107, which in this example comprises one or a plurality of axially acting helicoidal springs. Spring ring 106 is preloaded radially towards the outside of the pressure plate by having its free diameter larger than the inside diameter of the circular groove 103, and grips the circular ramp formed by inclined rear wall 105. The biassing of split spring ring 106 and its cooperation with ramp 105 forms a one-way connection between fulcrum ring 81 and main body 80 of pressure plate 58 which permits fulcrum ring 81 to move axially relative to main body 80 away from but not towards friction surface 77.

The outer peripheral wall 99 of fulcrum ring 81 supports outer ring 82 and comprises, from the front wall 98, an annular flange 110, an inclined shoulder 111, and an axially extending cylindrical part 112. Outer ring 82 comprises a front wall 118 and an annular groove 119 formed in the front wall and dimensioned to accommodate flange 110 of fulcrum ring 81. Groove 119 defines a radially extending shoulder 120 which abuts flange 110, when the mechanism is in the position shown in FIG. 2. Shoulder 120 is followed axially by a cylindrical section 121 and a radial flange 122 having an inner peripheral wall 126 adapted to bear on the axially extending cylindrical part 112 of fulcrum ring 81.

The inclined shoulder 111 formed on the inner peripheral wall 99 of fulcrum ring 81, and cylindrical section 121 formed on outer ring 82, define between them an annular space 130 which accommodates a split spring ring 131 having a gap therein which is urged axially towards inclined shoulder 111 by spring means 132 which in this example comprises one or more axially-acting helicoidal springs. Split spring ring 131 is preloaded radially towards the inside of the pressure plate 58 by having its free diameter smaller than the outside diameter of fulcrum ring 81, and thus grips inclined shoulder 111 to effect a one-way connection between the fulcrum ring 81 and the outer ring 82, as will be described.

The outer periphery 63 of the diaphragm spring 62 is retained in contact with the pressure plate fulcrum 76 by means of a series of spaced spring clips (one shown 135). Each spring clip 135 is secured to fulcrum ring 81 by means of a rivet 136 (in a variant a screw), and has a free end 137 which is bent over towards the axis of the assembly and outurned so that it grips the periphery of the diaphragm 62. The other free end 138 of spring clip 135 extends generally axially beyond cylindrical part of fulcrum ring 81 and is bent over to apply a load to flange 122 of outer ring 82. This pre-loads the outer ring 82 to fulcrum ring 81 to ensure a constant "free state" relationship between the two.

In the unworn condition of the clutch disc shown in FIG. 2, during clutching and declutching the components of pressure plate 58 remain in substantially the same relative positions illustrated in the drawing, and the clutch behaves as though it were fitted with a unitary pressure plate of the kind shown in FIG. 1. Load from diaphragm spring 62 is applied to fulcrum 76 and transferred to main body 80 via the co-operating surfaces 84 and 94 of the fulcrum ring 81 and main body respectively. Torque is transmitted to pressure plate 58 via cover 54 and straps 88 connected to outer ring 82 and body part 80. Any tendency of outer ring 82 to retract under the action of straps 88 is prevented by end portions 138 of springs 135 which oppose the action of straps 88 and which urge shoulder 120 of outer ring 82 against flange 110 of fulcrum ring 81.

During declutching, positive retraction of the pressure plate 58 as a unit occurs as a result of the connections formed by end portions 137 of springs 135 between the pressure plate fulcrum 76 and the outer peripheral portion 63 of the diaphragm spring 65. This retractive effort is transferred to outer ring 82 via flange 110 and shoulder 120. Furthermore, it will be appreciated that main body 80 and outer ring 82 of pressure plate 58 are in any event both subject during declutching to the retractive effort applied by straps 88.

FIG. 4 illustrates the operation of the wear compensation mechanism in the clutch engaged position. In this drawing, linings 53 of clutch disc 52 have worn, causing pressure plate 58 and outer peripheral portion 63 of diaphragm 62 to move to the left in FIG. 4 in the clutch engaged position, and causing a corresponding movement in the opposite direction of resilient fingers 65. This wear is detected by engagement of lug 115 of ear 86 with the forward edge of opening 116 in cover 54. This engagement blocks movement of outer ring 82 towards flywheel 50, the load applied by the diaphragm spring separating outer ring 82 axially from main body 80 and fulcrum ring 81 against the action of straps 88, and creating a gap 140 between flange 110 of fulcrum ring 81 and shoulder 120 of outer ring 82. This relative axial displacement allows split ring 131 to move up inclined face 111 of fulcrum ring 81 under the action of spring means 132.

On declutching of the assembly, the components take up the positions shown in FIG. 5. Peripheral portion 63 of diaphragm spring 62 moves to the right of its position shown in FIG. 4 and draws fulcrum ring 81 axially in the same direction relative to body part 80 to take up the gap 140 between the fulcrum ring 81 and outer ring 82 created by the wear of the friction surfaces. Any tendency of outer ring 82 to re-establish its original position relative to body part 80 i.e. to close gap 140 during declutching, is prevented by the action of split ring 131 against inclined face 111, this one-way connection permitting axial movement of fulcrum ring 81 in a direction away from flywheel 50, but not movement of outer ring 82 relative to fulcrum ring 81 towards the flywheel.

In the position shown in FIG. 5, fulcrum ring 81 has taken up the space left by outer ring 82 and moved axially away from the flywheel to compensate for wear of the friction surfaces 53, thus re-establishing the orientation of the diaphragm spring within the assembly. On re-engagement of the clutch from the position shown in FIG. 5, the inner split spring ring 106 is already loaded against ramp 105 in fulcrum ring 81 by spring means 106, thus preventing any axial movement of fulcrum ring 81 relative to main body 80 in a direction towards the flywheel 50. The clamp load is again transmitted to the clutch disc.

Figure 6:
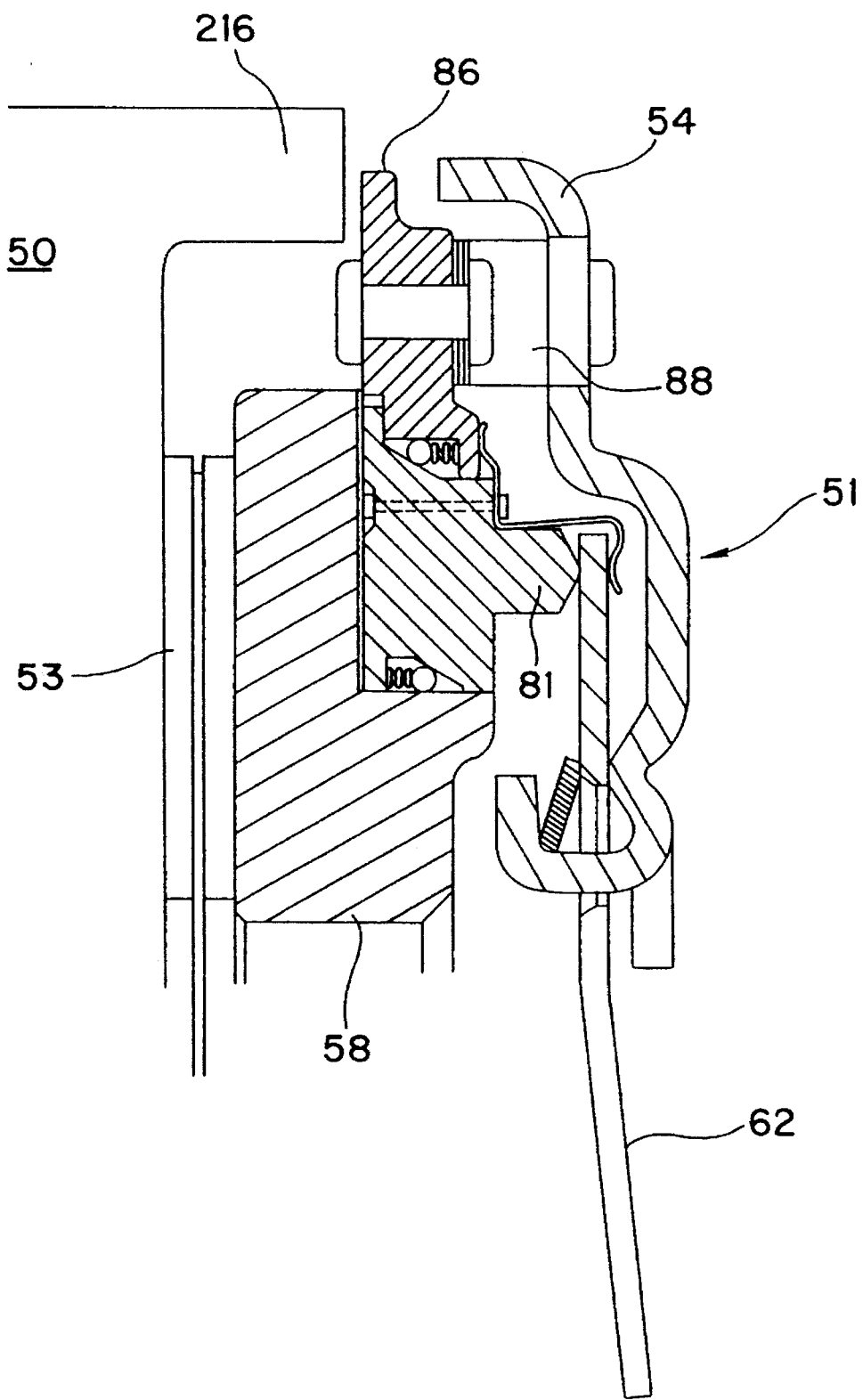
FIG. 6 is a sectional view of part of another embodiment of diaphragm spring clutch fitted with an automatic wear compensating mechanism.

In a variant shown in FIG. 6, instead of openings 116 formed in the extended wall of pressed cover 54, the engine flywheel 50 is formed on its outer periphery with axially-extending abutment 216. Wear in the friction linings 53 is detected by engagement of ears 86 of lugs 115 with abutment 216.

While operation of the assembly has been illustrated step-wise in the drawings, it will be appreciated that the mechanism in fact operates continuously throughout the life of the friction linings. Since the orientation of the diaphragm spring thereby remains substantially constant within the assembly, the mechanism provides a constant pedal load throughout the life of the clutch as well as automatic adjustment for wear. Furthermore, the constant orientation of the diaphragm spring provides substantially more space for the friction disc and its associated damper assembly.

While the invention has been described with reference to a particular embodiment thereof, it will be understood that various modifications may be made without departing from the spirit and scope of the invention. For example, while the invention is described with reference to a clutch in which the release bearing is adapted to declutch the assembly by pushing on the fingers of the diaphragm spring (a "push-off" clutch), it is equally applicable to an arrangement in which the relative positions of the pressure plate and primary fulcrums are reversed, and declutching is achieved by pulling the ends of the fingers away from the pressure plate (a so-called "pull" type clutch). Furthermore, the clutch assembly may be a multi-plate clutch having more than one pressure plate and diaphragm spring, and/or one in which a reaction plate takes the place of the flywheel.

What is claimed is:

1. A diaphragm spring clutch assembly comprising a generally annular cover member, a pressure plate having a friction surface on one side thereof for engagement with friction linings of a clutch disc intended to be clamped between the pressure plate and an engine flywheel; connection means connecting the pressure plate to the cover member for rotation therewith whilst permitting axial displacement relative thereto; generally annular fulcrum means on said pressure plate disposed on the side thereof opposite said friction surface; a diaphragm spring disposed between said cover member and said pressure plate fulcrum means, said diaphragm spring having an outer peripheral portion in the form of a Belleville washer and being operable to apply an elastic clamping load to said pressure plate to cause said pressure plate to grip a clutch disc disposed between the engine flywheel and the pressure plate, and an inner portion divided into fingers for engagement by clutch release means; wherein said diaphragm spring clutch assembly incorporates a self-adjusting mechanism operable in use to compensate for axial movement of the pressure plate fulcrum towards the flywheel as a result of wear of said friction linings; wherein said pressure plate comprises:

i) a generally annular pressure plate body formed with said friction surface;

ii) a generally annular fulcrum member having an outer peripheral wall comprising said pressure plate fulcrum received within a circular recess formed in the outer periphery of said annular pressure plate body on the side opposite the friction surface and being axially movable with respect to said pressure plate body;

iii) an annular control member supported by the outer peripheral wall of said fulcrum member and adapted to control said relative axial movement of said fulcrum member and being axially displaceable with respect to said pressure plate body and said fulcrum member on wear of said friction linings thereby to permit corresponding movement of said fulcrum member axially away from said friction surface;

iv) means for moving said fulcrum member axially away from said friction surface during declutching; and v) one-way connection means disposed between said fulcrum member and said pressure plate body operable to prevent return movement of said fulcrum member relative to said pressure plate body in a direction towards said friction surface.

2. A diaphragm spring clutch assembly as claimed in claim 1, wherein said control member is operable to abut said cover member on wear of said friction linings, and said axial displacement of said control member relative to said pressure plate body and said fulcrum member is caused by the action of said diaphragm spring on the pressure plate fulcrum during clutch engagement.

3. A diaphragm spring clutch assembly as claimed in claim 2, wherein said control member is of generally annular form and is disposed on the outer periphery of said pressure plate body, and is provided with abutment means for engagement with said cover member.

4. A diaphragm spring clutch assembly as claimed in claim 3, wherein said abutment means comprise a plurality of ears extending radially from the outer periphery of the control member; and said cover member is formed with an outer peripheral wall having a series of corresponding openings therein adapted to receive said ears; said ears being engageable with the edges of the respective openings on wear of said friction linings.

5. A diaphragm spring clutch assembly as claimed in claim 1, wherein said one-way connection means disposed between the fulcrum member and the pressure plate body comprises an annular groove formed in the outer peripheral wall of the fulcrum member and having an inclined wall section; a split spring ring disposed within said groove and operable to grip said inclined wall section; and a corresponding cylindrical surface on said pressure plate body operable to engage said split spring ring.

6. A diaphragm spring clutch assembly comprising a generally annular cover member, a pressure plate having a friction surface on one side thereof for engagement with friction linings of a clutch disc intended to be clamped between the pressure plate and an engine flywheel; connection means connecting the pressure plate to the cover member for rotation therewith whilst permitting axial displacement relative thereto; generally annular fulcrum means on said pressure plate disposed on the side thereof opposite said friction surface; a diaphragm spring disposed between said cover member and said pressure plate fulcrum means, said diaphragm spring having an outer peripheral portion in the form of a Belleville washer and being operable to apply an elastic clamping load to said pressure plate to cause said pressure plate to grip a clutch disc disposed between the engine flywheel and the pressure plate, and an inner portion divided into fingers for engagement by clutch assembly incorporates a self-adjusting mechanism operable in use to compensate for axial movement of the pressure plate fulcrum towards the flywheel as a result of wear of said friction linings; wherein said pressure plate comprises:

i) a generally annular pressure plate body formed with said friction surface;

ii) a generally annular fulcrum member comprising said pressure plate fulcrum and being axially movable with respect to said pressure plate body;

iii) a control member adapted to control said relative axial movement of said fulcrum member and being axially displaceable with respect to said pressure plate body and said fulcrum member on wear of said friction linings thereby to permit corresponding movement of said fulcrum member axially away from said friction surface;

iv) means for moving said fulcrum member axially away from said friction surface during declutching; and v) one-way connection means disposed between said fulcrum member and said pressure plate body operable to prevent return movement of said fulcrum member relative to said pressure plate body in a direction towards said friction surface;

wherein said control member is operable to abut said cover member on wear of said friction linings, and said axial displacement of said control member relative to said pressure plate body and said fulcrum member is caused by the action of said diaphragm spring on the pressure plate fulcrum during clutch engagement, and wherein said control member is of generally annular form and is disposed on the outer periphery of said pressure plate body, and is provided with abutment means for engagement with said cover member; and wherein said fulcrum member is provided with a radially outwardly-extending shoulder on its outer periphery; and said control member is provided with a corresponding radially inwardly-extending shoulder on its inner periphery; and said control member is operable to control axial movement of said fulcrum member away from said friction surface by mutual abutment of said shoulders.

7. A diaphragm spring clutch assembly comprising a generally annular cover member, a pressure plate having a friction surface on one side thereof for engagement with friction linings of a clutch disc intended to be clamped between the pressure plate and an engine flywheel; connection means connecting the pressure plate to the cover member for rotation therewith whilst permitting axial displacement relative thereto; generally annular fulcrum means on said pressure plate disposed on the side thereof opposite said friction surface; a diaphragm spring disposed between said cover member and said pressure plate fulcrum means, said diaphragm spring having an outer peripheral portion in the form of a Belleville washer and being operable to apply an elastic clamping load to said pressure plate to cause said pressure plate to grip a clutch disc disposed between the engine flywheel and the pressure plate, and an inner portion divided into fingers for engagement by clutch assembly incorporates a self-adjusting mechanism operable in use to compensate for axial movement of the pressure plate fulcrum towards the flywheel as a result of wear of said friction linings; wherein said pressure plate comprises:

i) a generally annular pressure plate body formed with said friction surface;

ii) a generally annular fulcrum member comprising said pressure plate fulcrum and being axially movable with respect to said pressure plate body;

iii) a control member adapted to control said relative axial movement of said fulcrum member and being axially displaceable with respect to said pressure plate body and said fulcrum member on wear of said friction linings thereby to permit corresponding movement of said fulcrum member axially away from said friction surface;

iv) means for moving said fulcrum member axially away from said friction surface during declutching; and v) one-way connection means disposed between said fulcrum member and said pressure plate body operable to prevent return movement of said fulcrum member relative to said pressure plate body in a direction towards said friction surface wherein connection means are provided connecting said fulcrum member to said diaphragm spring, and said means for moving said fulcrum member axially away from said friction surface during declutching comprises said diaphragm spring; and wherein said connection means comprises a plurality of spring clips fixed to said fulcrum ring and disposed circularly around said diaphragm spring, each clip having one free end engaging the outer peripheral edge of said diaphragm spring and the other free end being operable to apply a load to said control member, thereby to urge said control member away from said fulcrum member.

8. A diaphragm spring clutch assembly comprising a generally annular cover member, a pressure plate having a friction surface on one side thereof for engagement with friction linings of a clutch disc intended to be clamped between the pressure plate and an engine flywheel; connection means connecting the pressure plate to the cover member for rotation therewith whilst permitting axial displacement relative thereto; generally annular fulcrum means on said pressure plate disposed on the side thereof opposite said friction surface; a diaphragm spring disposed between said cover member and said pressure plate fulcrum means, said diaphragm-spring having an outer peripheral portion in the form of a Belleville washer and being operable to apply an elastic clamping load to said pressure plate to cause said pressure plate to grip a clutch disc disposed between the engine flywheel and the pressure plate, and an inner portion divided into fingers for engagement by clutch assembly incorporates a self-adjusting mechanism operable in use to compensate for axial movement of the pressure plate fulcrum towards the flywheel as a result of wear of said friction linings; wherein said pressure plate comprises:

i) a generally annular pressure plate body formed with said friction surface;

ii) a generally annular fulcrum member comprising said pressure plate fulcrum and being axially movable with respect to said pressure plate body;

iii) a control member adapted to control said relative axial movement of said fulcrum member and being axially displaceable with respect to said pressure plate body and said fulcrum member on wear of said friction linings thereby to permit corresponding movement of said fulcrum member axially away from said friction surface;

iv) means for moving said fulcrum member axially away from said friction surface during declutching; and v) one-way connection means disposed between said fulcrum member and said pressure plate body operable to prevent return movement of said fulcrum member relative to said pressure plate body in a direction towards said friction surface;

wherein the connection means connecting the pressure plate to the cover comprise a plurality of tangential torque-transmitting resilient straps, each said strap being connected at one end to said cover member and at the outer end to said pressure plate body and, intermediate its ends, to said control member.

9. A diaphragm spring clutch assembly as claimed in claim 8, wherein a one-way connection is provided between the control member and the fulcrum member operable to resist retraction of said control member relative to said fulcrum member under the action of said resilient straps during declutching.

10. A diaphragm spring clutch assembly as claimed in claim 9, wherein said one-way connection comprises an inclined wall section formed on the outer peripheral wall of said fulcrum member and a split spring ring surrounding and gripping said wall section, said spring ring being engageable with a corresponding cylindrical wall section formed on the inner peripheral wall of said control member.

11. A diaphragm spring clutch assembly comprising a generally annular cover member, a pressure plate having a friction surface on one side thereof for engagement with friction linings of a clutch disc intended to be clamped between the pressure plate and an engine flywheel; connection means connecting the pressure plate to the cover member for rotation therewith whilst permitting axial displacement relative thereto; generally annular fulcrum means on said pressure plate disposed on the side thereof opposite said friction surface; a diaphragm spring disposed between said cover member and said pressure plate fulcrum means, said diaphragm spring having an outer peripheral portion in the form of a Belleville washer and being operable to apply an elastic clamping load to said pressure plate to cause said pressure plate to grip a clutch disc disposed between the engine flywheel and the pressure plate, and an inner portion divided into fingers for engagement by clutch assembly incorporates a self-adjusting mechanism operable in use to compensate for axial movement of the pressure plate fulcrum towards the flywheel as a result of wear of said friction linings; wherein said pressure plate comprises:

i) a generally annular pressure plate body formed with said friction surface;

ii) a generally annular fulcrum member comprising said pressure plate fulcrum and being axially movable with respect to said pressure plate body;

iii) a control member adapted to control said relative axial movement of said fulcrum member and being axially displaceable with respect to said pressure plate body and said fulcrum member on wear of said friction linings thereby to permit corresponding movement of said fulcrum member axially away from said friction surface;

iv) means for moving said fulcrum member axially away from said friction surface during declutching; and v) one-way connection means disposed between said fulcrum member and said pressure plate body operable to prevent return movement of said fulcrum member relative to said pressure plate body in a direction towards said friction surface;

wherein said control member is operable to abut said cover member on wear of said friction linings, and said axial displacement of said control member relative to said pressure plate body and said fulcrum member is caused by the action of said diaphragm spring on the pressure plate fulcrum during clutch engagement, and wherein said control member is of generally annular form and is disposed on the outer periphery of said pressure plate body, and is provided with abutment means for engagement with said cover member; and wherein said flywheel is provided with an axially-extending peripheral wall member, and said abutment means comprise a plurality of ears extending radially from the outer periphery of the control member, said ears being engageable with said axially-extending wall member on wear of said friction linings.

12. A cover assembly for a diaphragm spring clutch comprising an generally annular cover member, a pressure plate having a friction surface on one side thereof for engagement with friction linings of a clutch disc, connection means connecting the pressure plate to the cover member for rotation therewith whilst permitting axial displacement relative thereto; generally annular fulcrum means on said pressure plate disposed on the side thereof opposite to said friction surface; a diaphragm spring disposed between said cover member and said pressure plate fulcrum means, said diaphragm spring having an outer peripheral portion in the form of a Belleville washer and being operable to apply an elastic clamping load to said pressure plate, and an inner portion divided into fingers for engagement with clutch release means; wherein said cover assembly incorporates a self-adjusting mechanism operable in use to compensate for wear of said clutch disc; wherein said pressure plate comprises a generally annular pressure plate body formed with said friction surface; a generally annular fulcrum member having an outer peripheral wall comprising said pressure plate fulcrum received within a circular recess formed in the outer periphery of said annular pressure plate body on the side opposite the friction surface and being axially moveable with respect to said pressure plate body; an annular control member supported by the outer peripheral wall of said fulcrum member and adapted to control said relative axial movement of said fulcrum member and being axially displaceable with respect to said pressure plate body and said fulcrum member on wear of said clutch disc thereby to permit corresponding movement of said fulcrum member axially away from said friction surface; means for moving said fulcrum member axially away from said friction surface during declutching; and one-way connection means disposed between said fulcrum member and said pressure plate body operable to prevent return movement of said fulcrum member relative to said pressure plate body in a direction towards said friction surface.

\* \* \* \* \*